(12) United States Patent
Gerhardt

(10) Patent No.: US 6,298,389 B1
(45) Date of Patent: Oct. 2, 2001

(54) METHOD FOR INPUT AND OUTPUT OF STRUCTURES FOR THE JAVA LANGUAGE

(75) Inventor: Alan L. Gerhardt, Dallas, TX (US)

(73) Assignee: Compaq Computers, Inc., Cupertino, CA (US)

(*) Notice: Subject to any disclaimer, the term of this patent is extended or adjusted under 35 U.S.C. 154(b) by 0 days.

(21) Appl. No.: 08/879,737

(22) Filed: Jun. 20, 1997

(51) Int. Cl.[7] .................... G06F 9/45; G06F 9/54
(52) U.S. Cl. ........................... 709/313; 717/5
(58) Field of Search .................... 395/705, 706, 395/707, 680, 703, 702; 709/300

(56) References Cited

U.S. PATENT DOCUMENTS

| | | | | |
|---|---|---|---|---|
| 5,361,350 | * | 11/1994 | Conner et al. ............... | 395/600 |
| 5,493,680 | * | 2/1996 | Danforth ...................... | 395/700 |
| 5,675,801 | * | 10/1997 | Lindsey ....................... | 395/702 |
| 5,732,257 | * | 3/1998 | Atkinson et al. ............ | 395/604 |
| 5,884,083 | * | 3/1999 | Royce et al. ................ | 395/705 |

OTHER PUBLICATIONS (Digital Cat) "C2J, A C + + to Java translator". www.java-cats.com/US/search/rid00000279.html, Sep. 20, 1996.*
Jaworski, Jamie. "JAVA Developer's Guide", 1996.*
Ber Elliot Joel. "Java–Lex: A lexical analyzer generator for Java", Aug. 15, 1996.*
Gibello, Pierre–Yves. "ZQL: a Java SQL parser", Mar. 1998.*
Laffra, Chris. "Advanced Java". pp. 253–262 Sep. 1996.*
Aho, Alfred V., Ravi Sethi, Jeffrey D. Ullman. "Compilers: Principles, Techniques, and Tools". Chap. 9, Code Generation; p. 513–528, 1986.*
Kochan, Stephen G.. "Programming in C, Revised Edition". pp. 369–371, 1988.*
"Orbix for Java White Paper". IONA Technologies Ltd., p. 1–14, Feb. 1996.*
Eckel, Bruce. "C + +Idiom", pp. 1–15, Jul. 1993.*

* cited by examiner

Primary Examiner—Alvin Oberley
Assistant Examiner—Lewis A. Bullock, Jr.
(74) Attorney, Agent, or Firm—Fenwick & West LLP

(57) ABSTRACT

The present invention includes a method and apparatus that allows languages to send, receive and manipulate structures defined by other languages. Structurally, the present invention includes a preprocessor and a runtime library. The preprocessor accepts, as input, source code written in a high-level language, such as C or C++. The preprocessor produces, as output, a series of Java classes. Each Java class describes a structure defined in the input source code. Java programs use the descriptions produced by the preprocessor to send, receive and manipulate structures the structures defined in the input source code.

19 Claims, 5 Drawing Sheets

Fig. 3

```
                           206'
        typedef struct
        {
302a─── int x;
302b─── int y;
302c─── int z;
        } Coordinate3D;
              300
```

Fig. 4

```
                                          210'
        /*
                  Coordinate3D    400
        */
        public class Coordinate3D
        {
402a─── public final static int X = 0;
402b─── public final static int Y = 4;
402c─── public final static int Z = 8;

/* length of Coordinate3D */
402d─── public final static int structlen = 12;
        };
```

```
       typedef struct
       {
500a—  Coordinate3D Start;
500b—  Coordinate3D Stop;
       } Trip;
```

```
       /*
          Trip
       */
       public class Trip
       {
600a— public final static int  Start$X = 0;
600b— public final static int  Start$Y = 4;
600c— public final static int  Start$Z = 8;
600d— public final static int  Stop$X = 12;
600e— public final static int  Stop$Y = 16;
600f— public final static int  Stop$Z = 20;

/* length of Trip */
600g— public final static int  structlen = 24;
       };
```

Fig. 7

$\underline{206'''}$

```
        typedef struct
            {
700a ⌒  Coordinate3D Start[10];
700b ⌒  Coordinate3D Stop[5];
            } Trip;
```

Fig. 8

$\underline{210'''}$

```
        /*
            Trip
        */
        public class Trip
            {
800a ⌒  public final static int  Start$X[10] = {0, 12, 24, 36, 48, 60, 72, 84, 96, 108};
800b ⌒  public final static int  Start$Y[10] = {4, 16, 28, 40, 52, 64, 76, 88, 100, 112};
800c ⌒  public final static int  Start$Z[10] = {8, 20, 32, 44, 56, 68, 80, 92, 104, 116};
800d ⌒  public final static int  Stop$X[5] = {120, 132, 144, 156, 168};
800e ⌒  public final static int  Stop$Y[5] = {124, 136, 148, 160, 172};
800f ⌒  public final static int  Stop$Z[5] = {128, 140, 152, 164, 176};

/* length of Trip */
800g ⌒  public final static int  structlen = 180;

};
```

1002 — byte [] buffer = new byte[Coordinate3D.structlen];

1004 — in.read (buffer, 0, Coordinate3D.structlen);

1006 — inbuf received_structure = new inbuf (buffer);

1008 — int X = received_structure.readInt (Coordinate3D.X);
1010 — int Y = received_structure.readInt (Coordinate3D.Y);
1012 — int Z = received_structure.readInt (Coordinate3D.Z);

METHOD FOR INPUT AND OUTPUT OF STRUCTURES FOR THE JAVA LANGUAGE

FIELD OF THE INVENTION

The present invention relates generally to interprocess communication between processes created that use different programming languages. More specifically, the present invention includes a method and apparatus for input, output and manipulation of structures within processes created using languages that do not support structures.

BACKGROUND OF THE INVENTION

Interprocess communication, or IPC, is a general term for techniques that allow software processes to exchange information. By exchanging information, software processes cooperate to perform tasks. Functionally, the use of IPC offers a number of advantages over more traditional monolithic programming models. These advantages include ease of implementation, component reusability, and encapsulation of information. This combination of advantages has resulted in the widespread use of IPC.

Over time, IPC techniques have been adapted to meet the demands of increasingly sophisticated programming environments. Many of these adaptations have attempted to make IPC techniques easier for programmers to use. In spite of this evolution, there are still cases where programmers find the use of IPC techniques to be difficult or error prone. One of these cases arises when programmers attempt to use IPC techniques to send and receive structures within processes created using programming languages that do not provide support for structures. In more detail, high-level languages, such as C, C++ or Pascal, typically allow programmers to group data into aggregates known as structures. In practice, programmers typically use structures to compartmentalize or group related data. This allows related data to be manipulated as a single entity. Thus, for example, a structure might include data describing a hardware device, or data describing an employee record. Because structures contain related data, it is natural for cooperating processes to exchange structures using IPC.

Some high-level languages, namely Java, do not allow data to be grouped into structures. As a result, programmers find it difficult to program Java processes to receive and manipulate structures sent by other processes using IPC. The lack of support for structures also makes it difficult to program Java processes to send structures to other processes using IPC. The unfortunate result is that it is difficult to construct systems where Java-based processes cooperate with processes implemented using more traditional languages, such as C or C++. Since heterogeneous systems of this type are often useful, there exists a need for languages, like Java, to send, receive and manipulate structures.

SUMMARY OF THE INVENTION

The present invention includes a method and apparatus that allows languages to send, receive and manipulate structures defined by other languages. Structurally, the present invention includes a preprocessor and a runtime library. The preprocessor accepts, as input, source code written in a high-level language, such as C or C++. The preprocessor produces, as output, a series of Java source code modules.

Each Java source module output by the preprocessor includes a Java class. Each class corresponds to one of the structures defined in the preprocessor input. The preprocessor maintains this correspondence by naming each class to match the name of the corresponding structure definition. Each class functions as a description of the structure that it is named after. To perform this function, each class includes a series of static integers. One of these static integers is preferably given the reserved name structlen. The structlen static integer included in a class is initialized to be equal to the size of structure that the class is named after. Each of the remaining static integers included in a class is named after one of the elements included in the structure that the class is named after. Each of these static integers is initialized to equal the byte offset of the structure element that it is named after.

The classes are emitted by the preprocessor function as descriptions of the structures included in the C or C++ input file. As classes, these descriptions are available within Java programs. In this way, the present invention provides a method for generating descriptions of C and C++ structures with descriptions available within Java programs. Importantly, the descriptions provided by the preprocessor include the size of each structure and the offset of each element within the structures. These values are available as constants and may be used by programmers creating Java programs.

The present invention also includes a runtime library. The runtime library includes an inbuf Java class. The inbuf class includes a series of methods each designed to read a built-in Java type, such as an integer or character, from a byte array. Each method accepts an argument telling the method the offset within the byte array that the read of the built-in type is to be performed.

Programmers create Java programs to receive, manipulate and send C++ structures using the runtime library and the classes provided by the preprocessor. To receive a C or C++ structure, a programmer configures a Java program to call a standard Java IPC method. The received structure is then stored as a byte array. To access a structure element within the byte array, the programmer configures the Java program to call the appropriate inbuf method. Thus, if an integer value is to be accessed, the programmer configures the Java program to call the inbuf method for reading integers. The programmer specifies the offset of the desired element within the byte array using the description of the element included in the appropriate class provided by the preprocessor.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and together with the description, serve to explain the principles of the invention.

FIG. 3 is a diagram of an exemplary C structure definition.

FIG. 4 is a diagram of a Java class created by the preprocessor of the present invention for the structure definition of FIG. 3.

FIG. 5 is a diagram of an exemplary nested C structure definition.

FIG. 6 is a diagram of a Java class created by the preprocessor of the present invention for the nested structure definition of FIG. 5.

FIG. 7 is a diagram of an exemplary C structure definition that includes nested arrays of structures.

FIG. 8 is a diagram of a Java class created by the preprocessor of the present invention for the structure definition of FIG. 7.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Environment

Figure 1:
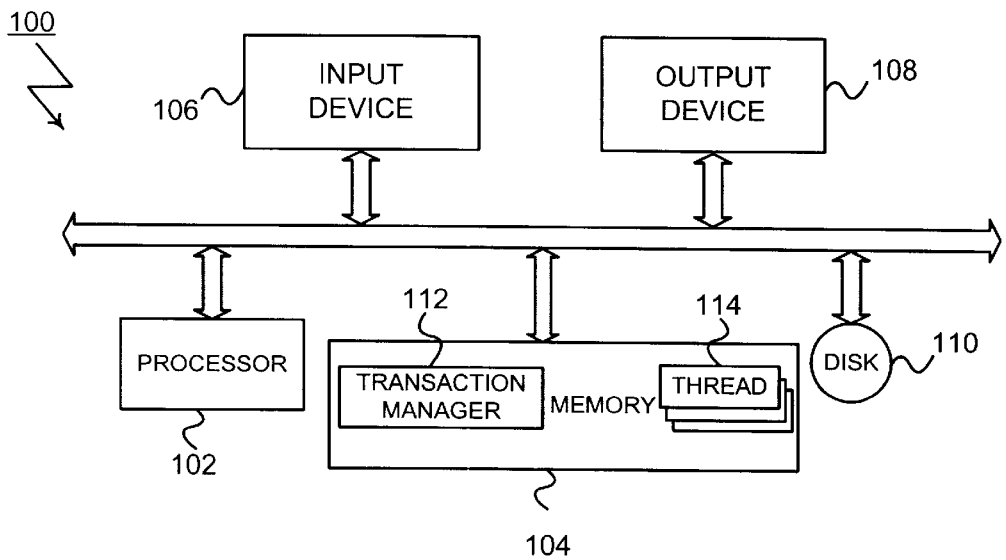
FIG. 1 is a block diagram of a host computer system in accordance with a preferred embodiment of the present invention.

In FIG. 1, a host computer system 100 is shown as a representative environment for the present invention. Structurally, host computer system 100 includes a processor, or processors 102, and a memory 104. An input device 106 and an output device 108 are connected to processor 102 and memory 104. Input device 106 and output device 108 represent a wide range of varying I/O devices such as disk drives, keyboards, modems, network adapters, printers and displays. Host computer system 100 also includes a disk drive 110 of any suitable disk drive type (equivalently, disk drive 110 may be any non-volatile storage system such as "flash" memory). A transaction manager 112, and one or more threads 114 are shown to be resident in memory 104 of host computer 100.

Overview

Figure 2:
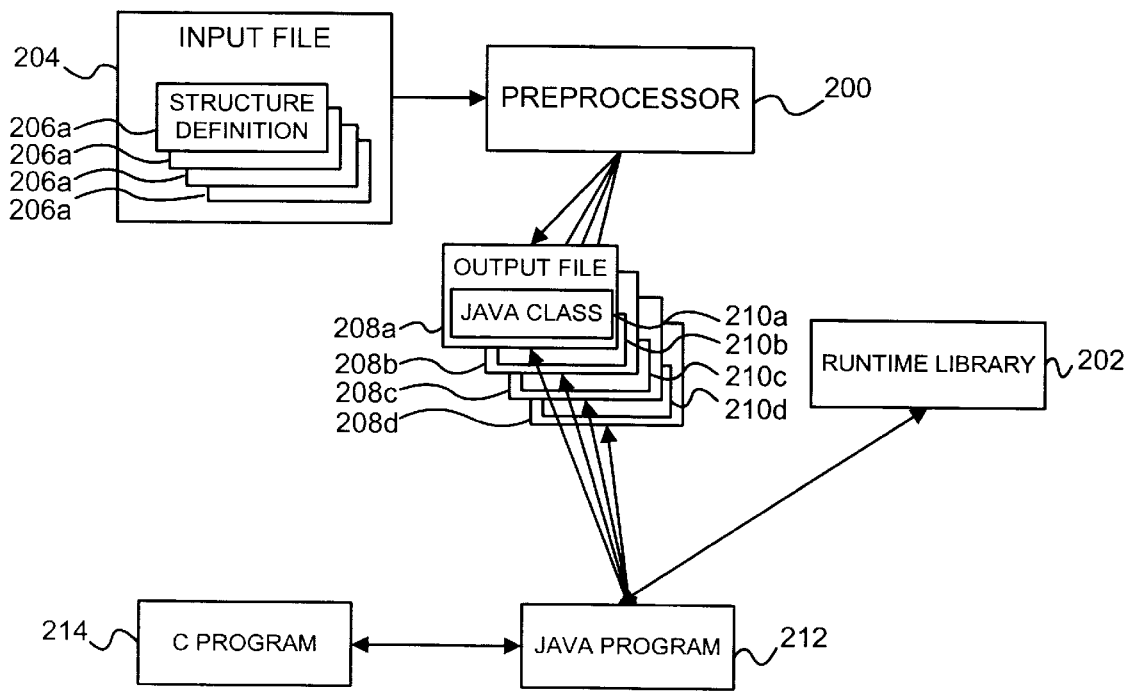
FIG. 2 is a block diagram showing the components included in a preferred embodiment of the present invention.

Turning to FIG. 2 it may be seen that the present invention includes a preprocessor 200 and a runtime library 202. Preprocessor 200 operates on input file 204. Input file 204 contains C or C++ source code and includes a series of structure definitions 206. For each structure definition 206 included in input file 204, preprocessor 200 produces a respective output file 208. Each output file 208 contains Java source code that defines a respective Java class 210. Java classes 210 act as descriptions of the structures defined by structure definitions 206. Programmers create Java programs, such as Java program 212, that use the descriptions provided by Java classes 210. Together, the use of these descriptions, along with calls to runtime library 202, allows Java program 212 to receive and manipulate structures sent by C or C++ programs, such as C program 214. Importantly, it will generally be the case that input file 204 will be one of the files used to construct C program 214. In this way, C program 214 and Java program 212 automatically use the same definitions for equivalent structures.

Preprocessor

Preprocessor 200 is preferably implemented as a parser that accepts the C and C++ languages. In general, parsers of this type may be constructed using a range of generally available parser generation tools, such as YACC or Bison. The design and construction of parsers is described in detail in Aho, Sethi and Ullman, *Compilers: Principles, Techniques and Tools*, Addison-Wesley (1986), Chap. 1–5, pp. 1–342, the disclosure of which is incorporated into this document by reference. As a parser, preprocessor 200 recognizes semantic constructs within input file 204. For most semantic constructs, preprocessor 200 is configured to produce no output. Thus, the default translation performed by preprocessor 200 is no output. The default translation is not used, however, when preprocessor 200 recognizes semantic constructs that correspond to structure definitions 206. Instead, preprocessor 200 produces an output file 208 containing a Java class 210 for each structure definition 206 recognized in input file 204.

The relation of structure definitions 206 to Java classes 210 is better understood by reference to structure definition 206' of FIG. 3 and corresponding Java class 210' of FIG. 4. As shown, structure definition 206' has a structure name 300 which, for purposes of illustration, is shown as the name "Coordinate3D." Structure definition 206' also includes three integer elements 302a through 302c that are shown as X, Y and Z, respectively. In general, it is to be appreciated that structure definition 206' is intended to be exemplary of the type of structure definitions 206 that may be included in any C or C++ source code file, such as input file 204.

FIG. 4 shows the Java class 210' output by preprocessor 200 for the particular structure definition 206'. Java class 210' has a class name 400 that corresponds to structure name 300 (i.e., both class name 400 and structure name 300 are the name "Coordinate3D"). Java class 210' includes four class members 402a through 402d. Each class member 402 is a public final static integer. Each of the first three of class members 402 corresponds to an element 302 included in structure definition 206' of FIG. 3. Thus, class member 402a corresponds to structure element 302a, class member 402b corresponds to structure element 302b and class member 402c corresponds to structure element 302c. Preprocessor 200 establishes this correspondence by naming each class member 402 to match the corresponding structure element 302. Thus, class member 402a and structure element 302a are both named "X." As described, preprocessor 200 names Java class 210' and class members 402 to match the corresponding structure name 300 and structure elements 302. It should be appreciated, however, that alternate naming schemes may be used without deviating from the spirit of the present invention. In particular, there may be cases where mangled names (such as names including an initial underscore) may be more appropriate.

Preprocessor 200 initializes each of the first three of class members 402 to describe the corresponding structure element 302. In particular, each of these class members 402 is initialized to be equal to the byte offset of the corresponding structure element 302 within structure definition 206'. Thus, class member 402b is initialized to the value of four since structure element 302b is positioned four bytes from the start of structure definition 206'.

Unlike class members 402a through 402c, class member 402d does not correspond to a structure element 302. Instead, preprocessor 200 initializes class member 402d to be equal to the total size, in bytes, of the structure defined by structure definition 206'. In the case of structure definition 206' of FIG. 3 the defined structure includes three four-byte integers for a total of twelve bytes. Thus, for this example, class member 402d is initialized by preprocessor 200 to have the value twelve.

FIGS. 3 and 4 show the correspondence between structure definition 206' and Java class 210'. It may be appreciated, however, that structure definition 206 is relatively simple and includes no nested structures. The use of preprocessor 200 to create Java classes 210 for more generalized structure definitions is better understood by reference to structure definition 206" of FIG. 5 and corresponding Java class 210" of FIG. 6. As shown in FIG. 5, structure definition 206" includes two nested structures 500a and 500b. Each of these nested structures 500 is an instance of the Coordinate3D structure of structure definition 206' of FIG. 3. As a result, structure definition 206" includes a total of six elements. These structure elements are: Start.X, Start.Y, Start.Z, Stop.X, Stop.Y and Stop.Z.

FIG. 6 shows the Java class 210" constructed by preprocessor 200 for structure definition 206". Structure definition 206" includes seven class members 600a through 600g. Each class member 600 is a public final static integer. Each class member 600 corresponds to one of the structure elements included in structure definition 206". Preprocessor 200 establishes this correspondence by naming each class member 600 to match the corresponding structure element. Thus, class member 600a is named "Start$X, class member 600b is named Start$Y and so on.

Preprocessor 200 initializes class members 600 in the same fashion as described for structure definition 206' and Java class 210'. Thus, preprocessor 200 initializes each of the first six class members 600 to be equal to the byte offset of the corresponding structure element within structure definition 206". In the case of class member 600a, this value is zero. For class member 600b, this value is four. The value increases by four for each of the first six class members 600.

Another example of the use of preprocessor 200 to create Java classes 210 for structure definitions is better understood by reference to structure definition 206'" of FIG. 7 and corresponding Java class 210'" of FIG. 8. As shown in FIG. 7, structure definition 206'" includes two nested arrays of structures 700a and 700b. Array of structures 700a includes ten instances of the Coordinate3D structure (i.e., the structure definition 206' of FIG. 3). Array of structures 702b is similar, except that five instances of the Coordinate3D structure are included. Overall, structure definition 206'" includes fifteen instances of the Coordinate3D structure for a total of forty-five elements. These structure elements are: Start[0].X, Start[0].Y, Start[0].Z . . . Start[9].X, Start[9].Y, Start[9].Z and Stop[0].X, Stop[0].Y and Stop[0].Z . . . Stop[4].X, Stop[4].Y and Stop[4].Z.

FIG. 8 shows the Java class 210'" constructed by preprocessor 200 for structure definition 206'". Structure definition 206'" includes seven class members 800a through 800g. The first six class members 800 are public final arrays of static integers. Each of these class members 800 corresponds to one of the structure elements included in array of structures 702a or array of structures 702b. For example, class member 800a corresponds to the element X included in array of structures 700a. Similarly, class members 800e corresponds to the element Y included in array of structures 700b. Preprocessor 200 establishes this correspondence by declaring each class member 800 to match the corresponding structure element. Thus, class member 800a is named "Start$X, class member 800b is named Start$Y, and so on.

Preprocessor 200 initializes each class member 800 to be equal to the byte offset of the corresponding structure element within structure definition 206'". This is accomplished by emitting a series of offsets for each class member 800. For example, the offsets 0, 12, 24, 36, 48, 60, 72, 84, 96 and 108 are emitted for class member 800a. The offsets 4, 16, 28, 40, 52, 64, 76, 88, 100 and 112 are emitted for class member 800b.

Preprocessor 200 constructs a Java class 210 of the type shown in FIGS. 4, 6 and 8 for each structure definition 206 included in input file 204. Together, the Java classes 210 output by the preprocessor 200 form a complete description of the structure definitions 206 included in input file 204.

Runtime Library

Runtime library 202 is preferably implemented to include a Java class inbuf. The inbuf class is declared as follows:

one public class inbuf
{
public inbuf (byte[ ] byte_array);
public String readString (int offset, int strlen);
public byte readByte (int offset);
public char readChar (int offset);
public short readShort (int offset);
public int readInt (int offset);
public long readLong (int offset);
public byte[ ] readData (int offset);
}

As shown, the inbuf class includes an inbuf constructor that takes, as an argument, a byte array. The remaining methods included in the inbuf class read and return intrinsic Java types, such as Strings, bytes, chars and shorts. Each method for reading an intrinsic type takes an integer offset argument. Each method reads the appropriate intrinsic type from the byte array passed to the inbuf constructor at the offset passed to the method. Thus, the inbuf class provides a generalized set of methods for reading intrinsic types from byte arrays and allows the offset for reading within the byte array to be specified.

Internally, the inbuf method is preferably implemented using the standard Java.io package. The Java.io package includes a number of classes including a ByteArrayInputStream class and a DataInputStream class. To use the Java.io package, the inbuf constructor creates a ByteArrayInputStream using the byte array passed to the inbuf constructor. The inbuf constructor then creates a DataInputStream using the created ByteArrayInputStream. The DataInputStream provides the methods that are used by the inbuf class to read and return intrinsic types from the byte array passed to the inbuf constructor.

Together, Java classes 210 emitted by preprocessor 200 and runtime library 202 provide a generalized method for manipulating C and C++ structures within Java programs. An exemplary use of Java classes 210 and runtime library 202 is shown as method 900 of FIG. 9. Method 900 begins with step 902 where Java program 212 receives a C structure from C program 214. In general, it should be appreciated that step 902 may be performed using a wide range of IPC techniques and will generally require a combination of IPC routines called by C program 214 and Java program 212. In this way, step 902 corresponds to the use of these techniques to transfer the data included in a structure from C program 214 to Java program 212. At the completion of step 902, the received structure is stored in a Java byte array.

In step 904, Java program 212 creates an instance of the inbuf class for the newly received structure. Creation of the inbuf class is performed by calling the inbuf constructor, passing the byte array where the received structure is stored, as an argument.

In step 906, Java program 214 reads an element of the received structure. To perform this read, Java program 214 calls a method of the inbuf class instance created in step 906. To specify the offset within the byte array where the read will be performed, Java program 214 passes the class member 402 that corresponds to the desired structure element 302.

Figures 9, 10:
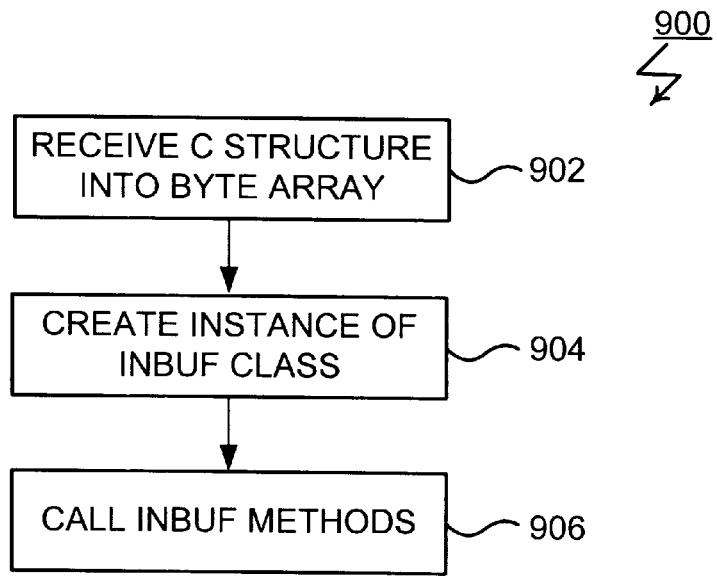
FIG. 9 is a flowchart showing the steps performed by a Java program to receive and manipulate a C structure using the Java classes and runtime library included in a preferred embodiment of the present invention.
FIG. 10 is a Java code fragment that corresponds to the method of FIG. 9.

In FIG. 10, a fragment of Java code illustrating the use of method 900 is shown and is generally designated 1000. At line 1002, Java fragment 1000 allocates a byte array using the Java new constructor. Since the allocated byte array is intended to receive a structure of the type defined by structure definition 206' of FIG. 3, the value Coordinate3D.structlen (i.e., a value of 12) is passed to the new constructor. At line 1004, the Java I/O method read is called to receive the desired structure into the allocated byte array. Once again, the value Coordinate3D.structlen is used, this time to inform the read method to read 12 bytes into the allocated byte array. Line 1004 corresponds, in a general sense, to step 902 of method 900.

At line 1006 of fragment 1000, a new inbuf is created for the allocated byte array. This line corresponds to step 904 of method 900. In the following three lines (i.e., lines 1008, 1010 and 1012), the inbuf readInt method is called to read the X, Y and Z structure elements 302 from the allocated byte array. In each case, the appropriate class member 402 is passed to the readInt method. Thus, to read the X structure element 302a, the class member Coordinate3D.X is passed to readInt. Lines 1008, 1010 and 1012 correspond to step 906 of method 900.

The present invention is capable of numerous embodiments. For example, it is entirely possible to create preprocessor 200 as a parser for languages other than C and C++. This allows Java program 212 to use structures defined using languages other than C and C++. Preprocessor 200 may also be configured to emit classes designed for use in languages other than Java. This allows the present invention to be used to pass structures to programs that are implemented using languages like Java that do not support structures. It is also possible for preprocessor 200 to encode additional information within class members 402. For example, type information might be encoded in class members 402 and then checked at runtime by Java program 212.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for using a structure defined by using a first programming language in a program defined by using a second programming language, the method including the steps, performed by a computer system, of:
   receiving a semantic construct that corresponds to a structure definition in the first programming language, the structure definition having a number of elements;
   defining a class corresponding to the structure definition using the second programming language; and
   defining one or more class members in the class, each class member corresponding to a respective element included in the structure definition, each class member initialized to be a value equal to the byte offset of the corresponding element in the structure definition.

2. The method as recited in claim 1 further comprising the step of defining an additional class member which does not correspond with an element in the structure definition but which is initialized to be a value equal to the size of the overall structure definition.

3. The method as recited in claim 1 wherein the structure definition has a structure name and wherein the class is defined to have a class name that is identical to the structure name.

4. The method as recited in claim 1 wherein each element in the structure definition has an element name and wherein each class member is defined to have a member name that is identical to the corresponding element name.

5. A method as recited in claim 1 wherein the class is defined as a Java class.

6. A method as recited in claim 1 wherein the structure is defined as a C or C++ structure.

7. A preprocessor for receiving programs and structures defined by using a first programming language and producing classes defined using a second programming language, the preprocessor performing the steps of:
   receiving semantic constructs and recognizing which semantic constructs correspond with structure definitions defined in the first programming language;
   producing class definitions in the second programming language, each respective class definition corresponding to a recognized structure definition;
   defining class members for each class definitions, wherein each respective class member corresponds with an element included in the structure definition corresponding to the class definition, each class member being initialized to be a value equal to the offset of the corresponding element described by that class member within the structure definition corresponding to that class definition.

8. A preprocessor as recited in claim 7, wherein each class member included in a class definition is named after the element described by that class member.

9. The preprocessor as recited in claim 7, wherein each class definition is named after the structure definition corresponding to that class definition.

10. The preprocessor as recited in claim 7, wherein each class definition includes an additional class member, whereby the additional class member is initialized to be a value equal to the overall size of the structure definition which corresponds to that class definition.

11. The preprocessor as recited in claim 7, wherein the first programming language is C or C++.

12. The preprocessor as recited in claim 7, wherein the second programming language is Java.

13. A computer program product for receiving programs and structures defined by using a first programming language and producing classes defined using a second programming language, the computer program product comprising:
   a computer-usable medium having computer-readable code embodied therein for performing the steps of:
      recognizing structures defined in the first programming language;
      producing class definitions, each respective class definition corresponding to a recognized structure; and
      defining class members for each class definition, each respective class member describing an element included in the structure corresponding to the class definition, with each class member included in any one class definition initialized to be a value equal to the byte offset of the element described by that class member within the structure corresponding to that class definition.

14. A computer program product as recited in claim 13, wherein each class member included in a class definition is named after the element described by that class member.

15. A computer program product as recited in claim 13, wherein each class definition is named after the structure corresponding to that class definition.

16. The computer program product as recited in claim 13 wherein each class definition includes an additional class member, the additional class member initialized to be a value equal to the size of the structure corresponding to that class definition.

17. The computer program product as recited in claim 13 wherein the first programming language is C or C++.

18. The computer program product as recited in claim 17 wherein the second programming language is Java.

19. The computer program product as recited in claim 15 wherein the class definitions and class member definitions are produced using a second programming language.

* * * * *

UNITED STATES PATENT AND TRADEMARK OFFICE
CERTIFICATE OF CORRECTION

PATENT NO.      : 6,298,389 B1
DATED           : October 2, 2001
INVENTOR(S)     : Alan L. Gerhadt It is certified that error appears in the above-identified patent and that said Letters Patent is hereby corrected as shown below:

<u>Title page,</u>
Item [56], U.S. PATENT DOCUMENTS, add the following reference:

-- 5,297,279 * 3/1994  Bannon et al. ................395/600 --

Signed and Sealed this

Fifth Day of August, 2003

JAMES E. ROGAN
*Director of the United States Patent and Trademark Office*